United States Patent [19]

Shibazaki

[11] 4,449,056
[45] May 15, 1984

[54] POWER SUPPLY CONTROL SYSTEM OF AN INSTALLATION INCLUDING SEVERAL DEVICES HAVING ELECTRIC CIRCUITS

[75] Inventor: Shigeru Shibazaki, Kawagoe, Japan
[73] Assignee: Pioneer Electronic Corporation, Tokyo, Japan
[21] Appl. No.: 305,217
[22] Filed: Sep. 24, 1981
[30] Foreign Application Priority Data
  Sep. 25, 1980 [JP] Japan .................. 55-136593[U]
[51] Int. Cl.³ ............................................. H01H 47/00
[52] U.S. Cl. ........................................ 307/38; 307/115
[58] Field of Search ................. 307/125, 38, 113, 115, 307/139, 141; 361/193; 369/6

[56] References Cited
U.S. PATENT DOCUMENTS
  4,138,006  3/1982  Himeno et al. ................. 307/38
  4,380,809  4/1983  Sato ............................... 307/115

Primary Examiner—Reinhard J. Eisenzop
Assistant Examiner—Todd E. DeBoer
Attorney, Agent, or Firm—Fleit, Jacobson, Cohn & Price

[57] ABSTRACT

A power supply control system of an installation including at least two devices having respectively electric circuits, e.g. a tuner, a tape deck and a main amplifier, which comprises a manually operated first switch adapted to generate a first control signal when closed; a control signal generating circuit adapted to generate a second control signal when activated; a manually operated second switch adapted to activate the control signal generating circuit when closed, the second switch being preferably a power supply switch of one of the devices; first switching means provided between the electric circuit of second one of the devices and a power supply and adapted to be rendered conductive in response to the first control signal from the switch; and second switching means provided between the electric circuit of third one of the devices and the power supply and adapted to be rendered conductive and nonconductive respectively by closing and opening of the manually operated first switch, the second switching means being further adapted to be able to turn nonconductive in response to the second control signal so that the supply of power to one of the devices can be controlled synchronously with the supply of power to another of the devices.

7 Claims, 3 Drawing Figures

POWER SUPPLY CONTROL SYSTEM OF AN INSTALLATION INCLUDING SEVERAL DEVICES HAVING ELECTRIC CIRCUITS

FIELD OF THE INVENTION

The present invention relates to a power supply control system of an electric installation, in particular to a remote-controlled power supply system of an installation including at least two devices respectively having electric circuits in which power supply to one or several of the devices is controlled by closing and opening of a power supply switch of another of the devices.

BACKGROUND OF THE INVENTION

Such a power supply control system is provided, for example, in an audio recording and/or reproducing installation including signal sources, e.g. a tape deck and a tuner, and a main or power amplifier for amplifying both signals from the signal sources. In this system, a relay is provided which is energized by closing the power supply switch of the tape deck or the tuner thereby to connect through its make contact the main amplifier to the power supply. The relay is necessarily maintained energized when the installation works, with the result that the necessary relay-energizing current through the power transmission lines has an undesirable influence on the regulation of the installation. Moreover, in the case of such an installation mounted on a vehicle e.g. a motorcar, the reliability of the relay falls and chatter of the relay contact tends to occur due to inevitable vibrations of the vehicle; as a result of which the installation tends to erroneously operate or get out of order.

To avoid such undesirable results attendant on the use of a relay for connecting the main amplifier to the power supply, power supply control systems having electronic switching devices such as transistors in place of the relay have been proposed, but none of them is successful in obtaining the desired reliability.

A power supply control system of an installation having signal sources, which comprises a tuner and a tape deck, and a main amplifier for amplifying both the signals from the signal sources is known, in which electric power is fed to a selected one of the signal sources while the signal from the energized one of the signal sources alone is transmitted to the main amplifier.

With respect to power supply switches, the known power supply system is arranged such that the signal sources only are provided with manually operated power supply switches and power supply to the main amplifier is controlled by operating the power supply switches of the signal sources. In this known system, no switch means is provided for selectively transmitting the signals from the signal sources to the main amplifier for the purposes of reduction in number of manually operated switches, improvement in reliability and reduction in size of the installation.

This known system has a drawback that both signals from the two signal sources can be simultaneously transmitted to the main amplifier and amplified thereby when both the power supply switches of the two signal sources are rendered conductive by accidental manual operations.

SUMMARY OF THE INVENTION

An object of the present invention is to provide a simple and reliable power supply control system of an electric installation including at least two signal source devices and a main amplifier for selectively amplifying the signals from the signal sources, in which the power supply switch of energized one of the signal sources can be automatically brought into its nonconductive state when a power supply switch of any other desired one of the signal sources is rendered conductive by manual operation.

In order to achieve the above object, the power supply control system of the present invention comprises a manually operated first switch adapted to generate a first control signal when closed; a control signal generating circuit adapted to generate a second control signal when activated; a manually operated second switch adapted to activate said control signal generating circuit when closed; first switching means provided between a power supply and the electric circuit of one of the devices included in the installation having the power supply control system of the present invention and adapted to be rendered conductive in response to the first control signal; and second switching means provided between the electric circuit of another of the devices and the power supply and adapted to be rendered conductive and nonconductive respectively by closing and opening of the manually operated first switch, the second switching means being further adapted to be able to turn nonconductive in response to the second control signal.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
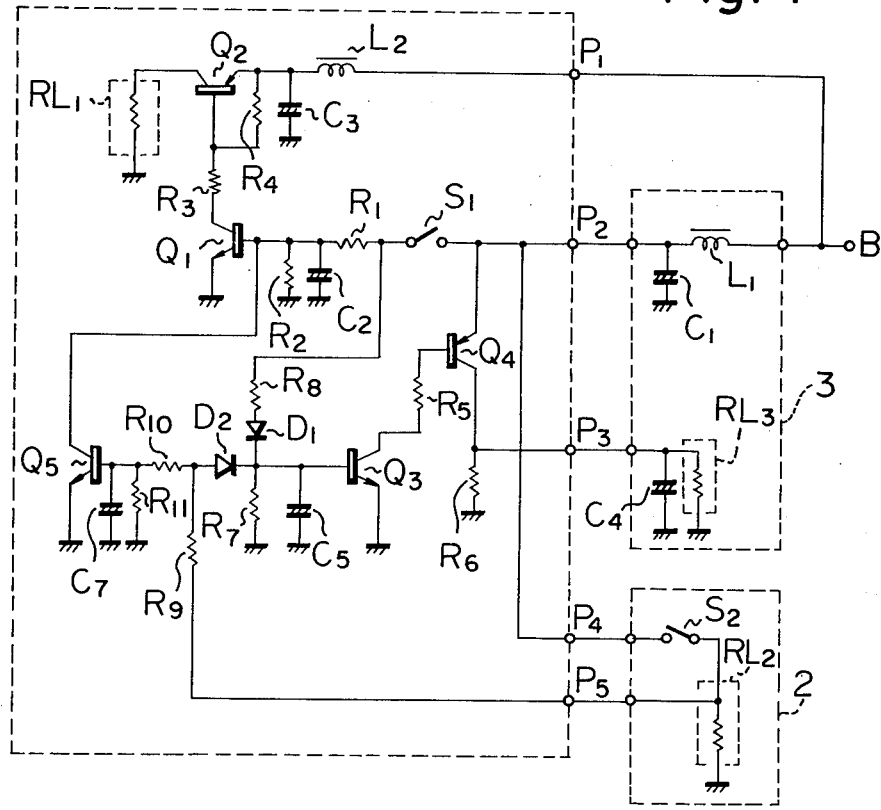
FIG. 1 is a circuit diagram of an embodiment of the power supply control system according to the present invention.

Referring now to FIG. 1, there is shown a power supply control system of the present invention incorporated in an audio recording and/or reproducing installation comprising a pair of signal sources 1 and 2, and a main amplifier 3 for selectively amplifying the signals from the signal sources 1 and 2. The signal sources 1 and 2 are, for example, a tuner and a tape deck, respectively. The load elements such as transistors, diodes, etc. contained in electric circuits of the tuner 1, tape deck 2 and amplifier 3 are only schematically shown and indicated by references $RL_1$, $RL_2$ and $RL_3$, respectively.

The tuner 1 has two power input terminals $P_1$ and $P_2$. The first terminal $P_1$ is directly connected to a power supply B and the second terminal $P_2$ is connected to the power supply B through a low-pass filter provided in the amplifier 3, the low-pass filter being constituted by a choke $L_1$ inserted in series between the terminal $P_2$ and the power supply B, and a capacitor $C_1$ inserted between an end of the choke $L_1$ and ground. An output terminal $P_4$ of the tuner 1 is directly connected to the second input terminal $P_2$. A manually operated power supply switch $S_1$ is provided on the tuner 1, a contact of which is connected to the terminal $P_2$ and the other contact is connected through a register $R_1$ to the base of a switching transistor $Q_1$. The base of the transistor $Q_1$ is connected to ground through a parallel circuit consisting of a register $R_2$ and a capacitor $C_2$. The registors $R_1$ and $R_2$, and the capacitor $C_2$ between the transistor $Q_1$ and the power supply switch $S_1$ constitutes a time constant circuit which serves to make smooth the potential change at the base of the transistor $Q_1$ with a predetermined time constant. The collector of the first transistor $Q_1$ is connected through a register $R_3$ to a second switching transistor $Q_2$ which is provided between the power input terminal $P_1$ and the load or electric circuit $RL_1$ of the tuner 1 and serves as a power supply switch for the load $RL_1$.

The collector of the transistor $Q_2$ is connected to an end of the load $RL_1$ and the emitter thereof is connected to the power input terminal $P_1$ through a low-pass filter consisting of a choke $L_2$ and a capacitor $C_3$. The emitter of the switching transistor $Q_2$ is further connected through a base bias registor $R_4$ to the base thereof. The power supply B is fed through the emitter-collector circuit of the second transistor $Q_2$ when $Q_2$ is rendered conductive by the collector output of the first transistor $Q_1$. The first transistor $Q_1$ in turn is rendered conductive by closing the power supply switch $S_1$ on the tuner 1. In the tuner 1, there is provided second switching means for controlling the supply of power to the load $RL_3$ of the main amplifier 3. The switching means comprises a third switching transistor $Q_3$ and a fourth transistor $Q_4$. The fourth transistor $Q_4$ is provided between the power supply B and the load $RL_3$ and adapted to be controlled by the switching operation of the third transistor $Q_3$. The emitter of the transistor $Q_3$ is connected to ground and the collector is connected through a register $R_5$ to the base of the transistor $Q_4$. The emitter of $Q_4$ is connected through the low-pass filter $C_1$, $L_1$ to the power supply B, and the collector of $Q_4$ is, on the one hand, connected through a register $R_6$ to ground and, on the other hand, connected through an output terminal $P_3$ of the tuner 1 to an end of the load $RL_3$ of the amplifier 3. The reference $C_4$ indicates a bypass capacitor.

To control the second switching means comprising transistors $Q_3$ and $Q_4$, there is provided a time constant circuit between the switch $S_1$ and the base of the transistor $Q_3$. The time constant circuit comprises a parallel circuit of resistor $R_7$ and a capacitor $C_5$ inserted between ground and the base of the transistor $Q_3$, and a series circuit of another registor $R_8$ and a diode $D_1$ inserted between the base of the transistor $Q_3$ and an end of the switch $S_1$. The diode $D_1$ is inserted so that it permits current to flow only in the direction from the switch $S_1$ to the base of $Q_3$ and the parallel circuit $R_7$, $C_5$. This time constant circuit serves with a predetermined time constant to make smooth the input voltage from the switch $S_1$ to the switching transistor $Q_3$, the transistor $Q_3$ being controlled in accordance with the voltage across the capacitor $C_5$ thereby to render the transistor $Q_4$ conductive and nonconductive.

A manually operated power supply control switch $S_2$ is provided on the tape deck 2. The switch $S_2$ is inserted between the load $RL_2$ of the tape deck 2 and the output terminal $P_4$ of the tuner 1 which is connected through the low-pass filter $C_1$, $L_1$ to the power supply B. The common point of the switch $S_2$ and the load $RL_2$ is connected to another input terminal $P_5$ of the tuner 1. The terminal $P_5$ is connected to the base of a transistor $Q_5$ through another time constant circuit which comprises a series circuit of registors $R_9$ and $R_{10}$ inserted between the base of $Q_5$ and the terminal $P_5$, and a parallel circuit of a register $R_{11}$ and a capacitor $C_7$ inserted between the base of $Q_5$ and ground. Another diode $D_2$ is inserted between the base of $Q_3$ and the common point of the registers $R_9$ and $R_{10}$ so that it prohibits current from flowing therethrough in the direction from the switch $S_1$ to the registors $R_9$ and $R_{10}$. The emitter of the transistor $Q_5$ is connected to ground and the collector is connected to the base of the transistor $Q_1$ so that the transistor $Q_5$ controls the transistor $Q_1$ thereby to controll the switch $Q_2$ between the power supply B and the load $RL_1$ of the tuner 1.

The operation of the power supply control system as shown in FIG. 1 will now be described. The tuner 1 is energized by closing the switch $S_1$. With the switch $S_1$ closed, the switching transistor $Q_1$ is rendered conductive thereby to render conductive the transistor $Q_2$ between the power supply B and the tuner load $RL_1$, whereby the tuner is fed with electric power. Meanwhile, with the switch $S_1$ closed, the power supply B is applied to the base of the transistor $Q_3$ via the registor $R_8$ and the diode $D_1$, whereby the transistor $Q_3$ also is rendered conductive. With the transistor $Q_3$ being rendered conductive, the transistor $Q_4$ also is rendered conductive so that the main amplifier load $RL_3$ is fed with electric power. Therefore, the tuner 1 and the main amplifier 3 are synchronously energized by manually closing the switch $S_1$ on the tuner 1, whereby the signal generated by the tuner 1 is transmitted to the amplifier 3 and amplified thereby.

If the switch $S_2$ on the tape deck 2 is closed by manual operation when the tuner 1 and the amplifier 3 are respectively maintained energized, the load or the electric circuit $RL_2$ of the tape deck 2 is fed with power. Meanwhile, with the switch $S_2$ then being closed, the power supply B is connected via the registor $R_9$ and the diode $D_2$ to the base of the transistor $Q_3$ and the transistors $Q_3$ and $Q_4$ are maintained conductive, whereby the power supply to the main amplifier 3 is maintained. On the other hand, the control signal generating circuit comprising the transistor $Q_5$ is activated or rendered conductive by closing the switch $S_2$. With the transistor $Q_5$ then being rendered conductive, a control signal of low level is transmitted to the switching transistor $Q_1$ from the collector output of $Q_5$, that is to say, the potential at the base of $Q_1$ is lowered, whereby both the transistors $Q_1$ and $Q_2$ between the power supply B and the tuner load $RL_1$ are rendered nonconductive. Therefore, the tape deck 2 is energized, the tuner 1 is deenergized and the main amplifier 3 is maintained energized, respectively, by closing the switch $S_2$ on the tape deck 2 when the other manual switch $S_1$ is closed. Then the amplifier 3 receives the signal from the tape deck 2 and amplifies it in place of the signal from the tuner 1.

In accordance with the circuit arrangement as shown in FIG. 1, the so-called popcorn noises can not occur when the switch $S_2$ is closed, because the time constant circuit $R_7$, $C_5$ inserted between the switch $S_2$ and the base of the transistor $Q_3$ serves to reduce the transient potential change at the base of the transistor $Q_3$ thereby to eliminate transient breaks in the supply of power to the amplifier 3.

Figure 2:
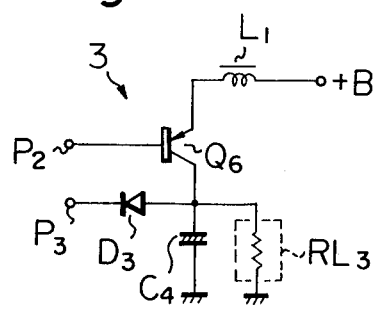
FIG. 2 is a circuit diagram of part of a modified embodiment of the power supply control system.

Referring now to FIG. 2, there is shown another example of power transmission lines in the main amplifier 3. In this example, the current to the load $RL_3$ is fed through the emitter-collector circuit of a transistor $Q_6$ of PNP type and the power supply to the input terminal $P_2$ of the tuner 1 is fed through the PN junction between the emitter and the base of the transistor $Q_6$. To avoid the occurrence of popcorn noises, a diode $D_3$ is inserted between the terminal $P_3$ of the tuner 1 and the bypass capacitor $C_4$, which diode serves as a discharging path for the capacitor $C_4$ when the amplifier 3 is deenergized.

Figure 3:
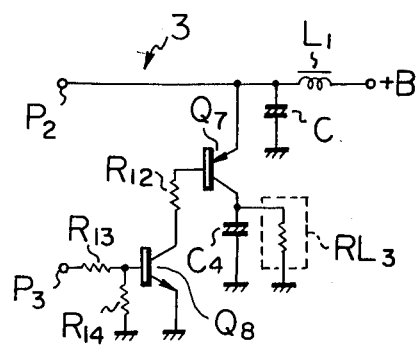
FIG. 3 is a circuit diagram of part of another modified embodiment of the power supply control system.

In FIG. 3, there is shown a further example of power transmission lines in the main amplifier 3. In the case of FIG. 3, the current to the load $RL_3$ is fed through a PNP transistor $Q_7$. A control circuit for controlling the transistor $Q_7$ is provided, which comprises a transistor $Q_8$ and registers $R_{12}$, $R_{13}$ and $R_{14}$ and serves to render the transistor $Q_7$ conductive and nonconductive in accordance with the potential at the output terminal $P_3$ of the tuner 1.

While the particular embodiment of the power supply control system shown and described is provided in an audio recording and/or reproducing installation including a tuner and a tape deck as signal sources, it will be understood that the present invention can be applied to other electric installations. For example, the present invention can be applied to an installation including a single signal source such as a tuner 1 and an amplifier 3. In this modified embodiment, the manually operated switch $S_2$ can be used as a remote-control switch for controlling the power supply to the signal source 1.

As will be understood from the above description, the power supply control system of the present invention can be set up at low cost and is reliable in operation, since it can be set up with the use of electronic switching devices such as transistors. Furthermore, when the system is provided in an installation including a plurality of signal sources, the power supply control system can be preferably used as switch means for selectively energizing the signal sources. Moreover, in accordance with the present invention, power supply switches of relatively small rated current values can be used, since no power supply switch is necessitated for a power amplifying stage such as the main amplifier 3 shown in the drawings.

What is claimed is:

1. A power supply control system for supplying a source voltage to load elements respectively contained in at least two signal source devices and at least one signal processing device for processing one of the output signals from at least one of said signal source devices, said control system comprising:
    manually operated first switch means provided within a first of said signal source devices;
    manually operated second switch means provided within a second of said the signal source devices for supplying said source voltage to the load elements of said second signal source device;
    reset signal generating means connected to said manually operated second switch means for producing a reset signal when said second switch means is operated;
    first switching circuit means for supplying said source voltage to said load elements of said first signal source device when said manually operated first switch means is operated, and being responsive to said reset signal to inhibit the source voltage applied to said first signal source device; and
    second switching circuit means for supplying said source voltage to said load elements of said signal processing device when either one of said first and second switches is manually operated.

2. A power supply control system according to the claim 1, in which said first switching circuit means includes:
    a first transistor being conductive in response to said reset signal; and
    a second transistor being rendered non-conductive in response to the conduction of said first transistor, for allowing the source voltage to pass therethrough to said load elements of said first signal source device.

3. A power supply control system according to the claim 1, in which said second switching circuit means includes:
    a third transistor;
    a fourth transistor being conductive in response to the conduction of said third transistor so as to pass therethrough the source voltage to the load elements of said signal processing device; and
    a gate circuit connected to said third transistor for rendering conductive said third transistor when either one of said manually operated first and second switch means is manually operated.

4. A power supply control system according to claim 1, in which said reset signal generating means includes:
    a fifth transistor being made conductive in response to the operation of said manually operated second switch means, so as to render said first transistor non-conductive.

5. A power supply control system according to the claim 1, in which said first signal source is a tuner and said second signal source is a tape deck.

6. A power supply control system according to claim 1, in which said second switching circuit means includes:
    a third transistor;
    a fourth transistor being conductive in response to the conduction of said third transistor;
    a gate circuit connected to said third transistor for rendering conductive said third transistor when either one of said manually operated first and second switch means is manually operated;
    a sixth transistor being conductive when said fourth transistor becomes conductive so as to pass therethrough the source voltage to the load elements of said signal processing device; and
    a discharge diode being conductive in response to the conduction of said sixth transistor and the non-conduction of said fourth transistor.

7. A power supply control system according to claim 1, in which said second switching circuit means includes:
    a third transistor;
    a fourth transistor being conductive in response to the conduction for said third transistor;
    a gate circuit connected to said third transistor for rendering conductive said third transistor when either one of said manually operated first and second switch means is manually operated;
    a seventh transistor for passing therethrough the source voltage to the load elements of said signal processing device when it is rendered conductive;
    an eighth transistor which is rendered conductive in response to the conduction of said fourth transistor so as to render the seventh transistor conductive.

* * * * *